United States Patent
Maniyar et al.

(10) Patent No.: US 12,524,428 B2
(45) Date of Patent: Jan. 13, 2026

(54) NATIVE COPY MECHANISM FOR IN-MEMORY AND PAGED PRIMITIVE DATA STRUCTURES

(71) Applicant: SAP SE, Walldorf (DE)

(72) Inventors: Anish Maniyar, Pune (IN); Santhosh T. Kumar, Bengaluru (IN); Guo Gang Ye, Shanghai (CN); Amit Pathak, Pune (IN); Sebastian Seifert, Heidelberg (DE); Souvik Pal, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/044,325

(22) Filed: Feb. 3, 2025

(65) Prior Publication Data

US 2025/0181600 A1 Jun. 5, 2025

Related U.S. Application Data

(63) Continuation of application No. 18/504,435, filed on Nov. 8, 2023, now Pat. No. 12,242,497.

(51) Int. Cl.
*G06F 16/25* (2019.01)
(52) U.S. Cl.
CPC .................................. *G06F 16/254* (2019.01)

(58) Field of Classification Search
CPC ...................................................... G06F 16/254
See application file for complete search history.

(56) References Cited

U.S. PATENT DOCUMENTS

| 11,151,126 B2* | 10/2021 | Florendo | G06F 16/24558 |
| 11,556,396 B2* | 1/2023 | Lytle | G06F 21/64 |

* cited by examiner

*Primary Examiner* — Jared M Bibbee
(74) *Attorney, Agent, or Firm* — Mintz Levin Cohn Ferris Glovsky and Popeo, P.C.

(57) ABSTRACT

A database system detects a query targeting a first database object stored in a unified persistence format in a persistence store. In response to detecting the query, the database system determines whether to load the first database object in column-loadable format or page-loadable format into an in-memory store. In response to determining to load the first database object in the column-loadable format, the database system determines if a first bit representation of one or more corresponding primitives in the persistence store is compatible with a second bit representation used for storing the primitives in the in-memory store. The database system performs a native copy operation to copy the primitives from the persistence store to the in-memory store if the bit representations are compatible, where the native copy operation involves copying the primitives on a page-by-page basis without decoding and encoding values of the one or more primitives.

20 Claims, 14 Drawing Sheets

NATIVE COPY MECHANISM FOR IN-MEMORY AND PAGED PRIMITIVE DATA STRUCTURES

CROSS REFERENCE TO RELATED APPLICATIONS

This application is a continuation of U.S. patent application Ser. No. 18/504,435 filed Nov. 8, 2023, entitled "NATIVE COPY MECHANISM FOR IN-MEMORY AND PAGED PRIMITIVE DATA STRUCTURES." The disclosure of which is incorporated herein by reference in its entirety.

TECHNICAL FIELD

The present disclosure generally relates to database processing.

BACKGROUND

A database is an organized collection of data. A database typically organizes data to correspond to how the data is logically arranged. This facilitates operations on the data, for example, looking up values in a database, adding data to the database, sorting the data in the database, or summarizing relevant data in the database. A database management system ("DBMS") mediates interactions between a database, users and applications in order to organize, create, update, capture, analyze and otherwise manage the data in the database.

In order to efficiently handle queries, databases are typically configured to perform in-memory operations on data. In an in-memory database, data needed to execute and respond to a query is loaded into memory, and the query is executed against that in-memory data. However, many applications have large data stores, and loading all of the required data into memory for these applications may be difficult due to memory limitations. The amount of data being processed by database systems continues to increase faster than memory devices are evolving to store more data.

SUMMARY

In some implementations, a database system detects a first query targeting a first database object stored in a unified persistence format in a persistence store, where a persistence representation of the first database object comprises one or more primitives. In response to detecting the first query, the database system determines whether to load the first database object in column-loadable format or page-loadable format into an in-memory store. In response to determining to load the first database object in the column-loadable format into the in-memory store, the database system determines if a first bit representation of the one or more primitives in the persistence store is compatible with a second bit representation used for storing the one or more primitives in the in-memory store. The database system performs a native copy operation to copy the one or more primitives from the persistence store to the in-memory store responsive to determining that the first bit representation is compatible with the second bit representation, where the native copy operation involves copying the one or more primitives on a page-by-page basis without decoding and encoding values of the one or more primitives.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
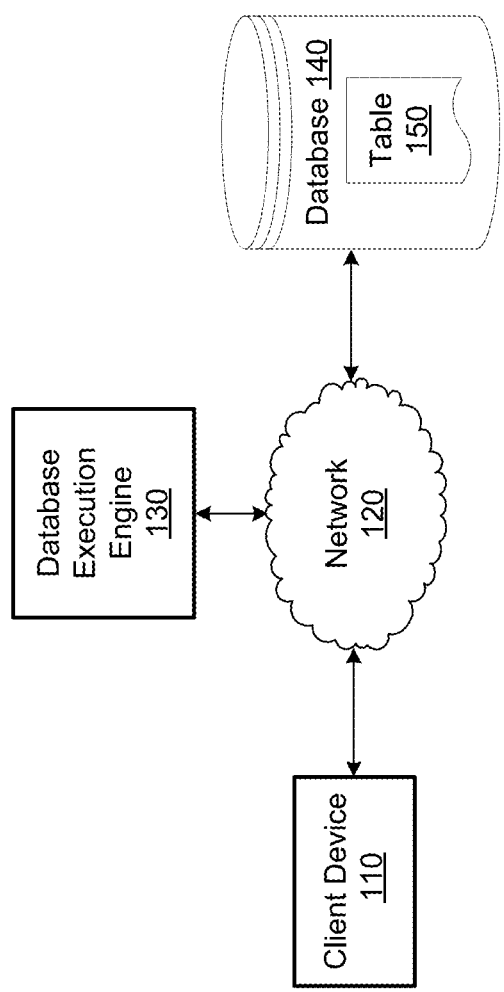
FIG. 1 illustrates an example of a database system, in accordance with some example implementations of the current subject matter.

Due to the need to process large amounts of data quickly, analytical systems are commonly designed to work on in-memory columnar databases. Analytical databases often include large tables of many rows of data, resulting in large amounts of columnar data that needs to be stored. A typical database may use various memory and/or storage devices for storing the columnar data, with the memory and/or storage devices organized as a persistent store and an in-memory store. The persistent store and the in-memory store can each be implemented with any number and type of memory devices. One approach to reduce the memory resources needed by a database is to compress column data. For these compression schemes, a database stores each column as a plurality of substructures that collectively forms and represents the column.

When a database employs dictionary encoding, these substructures may include a dictionary, a data vector, and an index, by way of non-limiting example. The dictionary may associate each unique data value with a corresponding value identifier (ID). The value IDs may be numbered sequentially. The data vector may include value IDs that map to the actual values of the database object. The index may include a sequential listing of each unique value ID and one or more positions in the data vector containing the value ID.

In some embodiments, when storing database objects in the persistent store, the database stores the database objects (e.g., columns) and substructures in a unified persistence format. The unified persistence format includes a separate composite page chain for the data, dictionary, and index vectors. When loading database objects stored in the unified persistence format from the persistent store to the in-memory store, processing logic determines in what format to store a given database object in the in-memory store based at least on a corresponding attribute, the current workload, and current operating conditions. One format used for bringing database objects from persistence locations to in-memory locations is referred to as a column-loadable format. For the column-loadable format, the entire column is fully loaded into memory when the column is being queried. Fully loading the entire column into memory means bringing the entirety of the column's data, dictionary, and index into memory. Another type of format that can be employed is referred to as a page-loadable format. For the page-loadable format, only the pages which contain part of the column relevant to the query are loaded into memory. In other embodiments, other types of formats may be employed.

Various primitives may be generated when creating an in-memory representation of a database object. As used herein, the term "primitive" is defined as an encoded version of a substructure of a database object. Non-limiting examples of substructures include a data vector, a dictionary, an index vector, and an inverted index vector. Non-limiting examples of database objects include a table, a column, and a partition.

A PagedBitVector is one example of a native storage primitive which is used for storing paged bitwise information. In an example employing sparse encoding, the PagedBitVector stores paged bitwise information which indicates the positions of most frequently occurring values. In another example employing cluster encoding, the PagedBitVector stores paged bitwise information to indicate which clusters are single value clusters. It is noted that the term "PagedBitVector" may also be referred to herein as "paged-format bit vector" or "paged bit vector". Another type of structure is the BitVector structure, which stores bitwise information for in-memory database objects which are stored in column-format. The "BitVector" structure may also be referred to herein as the "column-format bit vector" or "column bit vector".

Typically, copying from PagedBitVector to BitVector or from BitVector to PagedBitVector takes significant time and consumes significant processing and memory resources. During copying operations, a single bit-by-bit copy or word-by-word copy is typically performed. This has been found to be a major performance hurdle during load and save operations since a single page is being accessed multiple times.

Accordingly, the native copy techniques proposed herein are intended to improve these techniques of copying data from PagedBitVector to BitVector and vice versa. These native copy techniques involve copying data one page at a time from source to destination, after ensuring byte compatibility of serialized PagedBitVector data and BitVector data. Also, during load operations, when copying from persisted PagedBitVector to in-memory BitVector, page prefetching may be employed, where the number of pages being prefetched is set by a configuration parameter. This prefetching also helps to reduce input/output wait times, resulting in a performance boost for the copy operations.

Referring now to FIG. 1, a system diagram illustrating an example of a database system 100 is depicted, in accordance with some example embodiments. In FIG. 1, the database system 100 may include one or more client devices 110, a database execution engine 130, and one or more databases 140. It is noted that the terms "database execution engine" and "processor" may be used interchangeably herein. Database 140 is shown as including table 150, which is representative of any number and type of database objects stored by database 140.

The one or more client devices 110, the database execution engine 130, and the one or more databases 140 may be communicative coupled via a network 120. The one or more databases 140 may include a variety of relational databases including, for example, an in-memory database, a column-based database, a row-based database, and/or the like. The one or more client devices 110 may include processor-based devices including, for example, a mobile device, a wearable apparatus, a personal computer, a workstation, an Internet-of-Things (IoT) appliance, and/or the like. The network 120 may be a wired network and/or wireless network including, for example, a public land mobile network (PLMN), a local area network (LAN), a virtual local area network (VLAN), a wide area network (WAN), the Internet, and/or the like.

Figure 2:
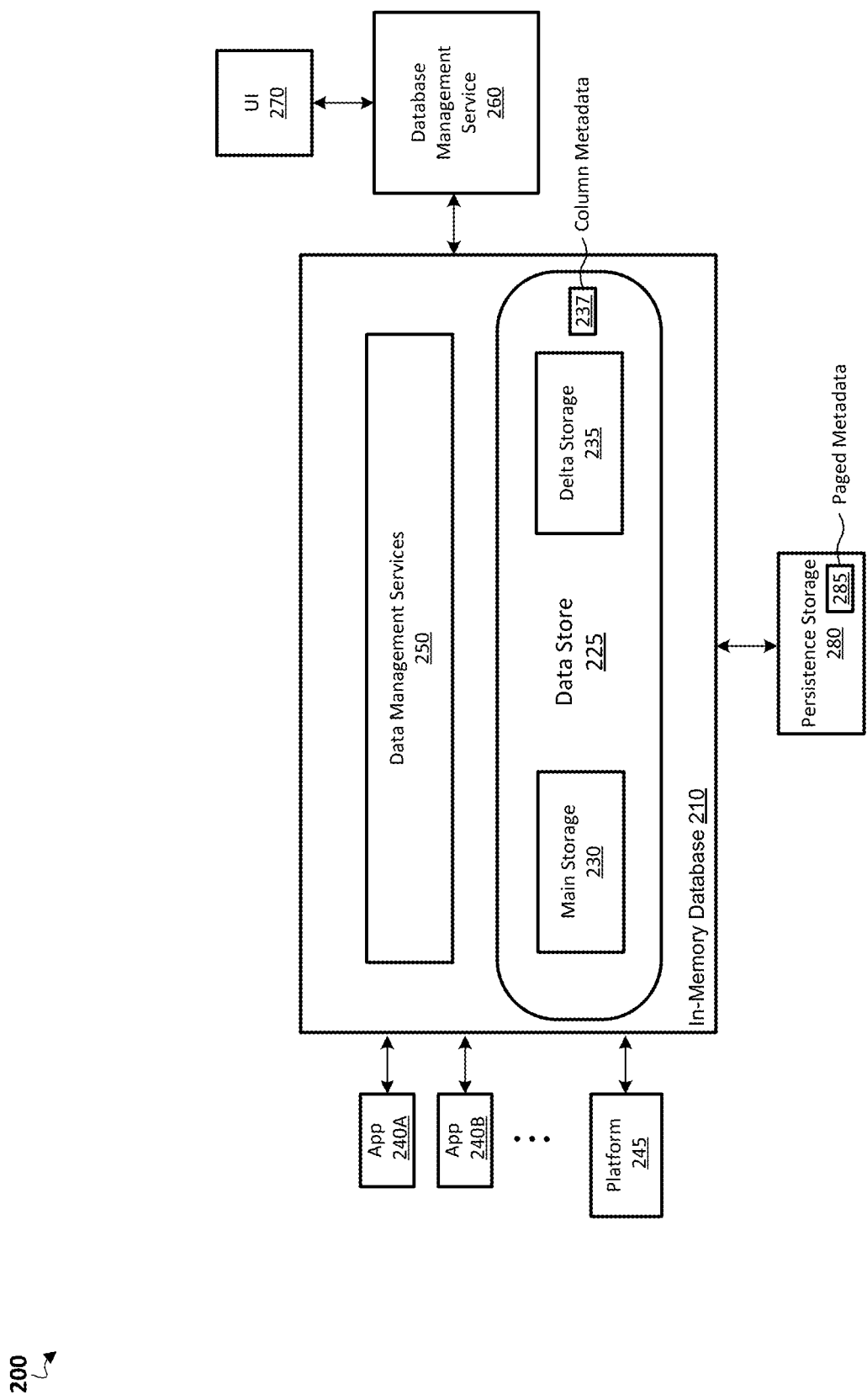
FIG. 2 illustrates another example of a system, in accordance with some example implementations of the current subject matter.

Turning now to FIG. 2, a diagram is depicted illustrating an example of a system 200 consistent with implementations of the current subject matter. System 200 includes applications 240A-B which interact with in-memory database 210. Applications 240A-B are representative of any number and type of applications executing within system 200. For example, applications 240A-N can include analytical services, transaction processing service, reporting services, dashboard services, and the like. Applications 240A-N interact with database 210 using structure queries or other expressions. System 200 also includes one or more platforms 245. In some embodiments, a given platform 245 can be a data warehousing service that exposes online analysis processing (OLAP) services to a user or application. The database management service 260 provides administration services and access to settings of the in-memory database 210. The user interface (UI) 270 mediates interactions between the database management service 260 and a user or application, for example, to configure the in-memory database 210 or set user preferences for sort operations.

Within the in-memory database 210, the data management services 250 manage transactions with the main storage 230 and the delta storage 235. The data management services 250 can provide a calculation and planning engine, modeling services, real-time replication services, data integration services, and/or other services. The main storage 230 supports fast read access to data of the database 210 in data store 225. A read operation accesses both the main storage 230 and delta storage 235, which includes any recently changed data that has not yet been incorporated into the main storage 230. Column metadata 237 includes details on the in-memory representations of the database objects, with column metadata 237 including information such as the encoding schemes applied to the data, starting address of column, ending address of column, primitive byte representation format, number of bits per row element, and so on.

The data in the main storage 230 may be backed up to persistence storage 280. Persistence storage 280 may be disk storage or other suitable type of memory device (e.g., solid-state drive (SSD)). The change data in the delta storage 235 is also backed up to persistence storage 280, so that changes survive events such as database failures, downtimes, and so on.

In some embodiments, the persistence storage 280 stores database objects in a single unified persistence format regardless of the load unit of the objects. The unified persistence format will be described in more detail throughout the remainder of this disclosure. Persistence storage 280 also stores paged metadata 285 which includes metadata of the various database objects stored in unified persistence format in persistence storage 280. Paged metadata 285 may include encoding details, primitive byte representation details, starting page address for each page chain, final page address for each page chain, and additional information for each database object stored in persistence format 280.

It should be understood that the example architecture of system 200 is merely indicative of what may be employed in some embodiments. In other embodiments, system 200 may be structure in other manners with other suitable arrangements of components.

Figure 3:
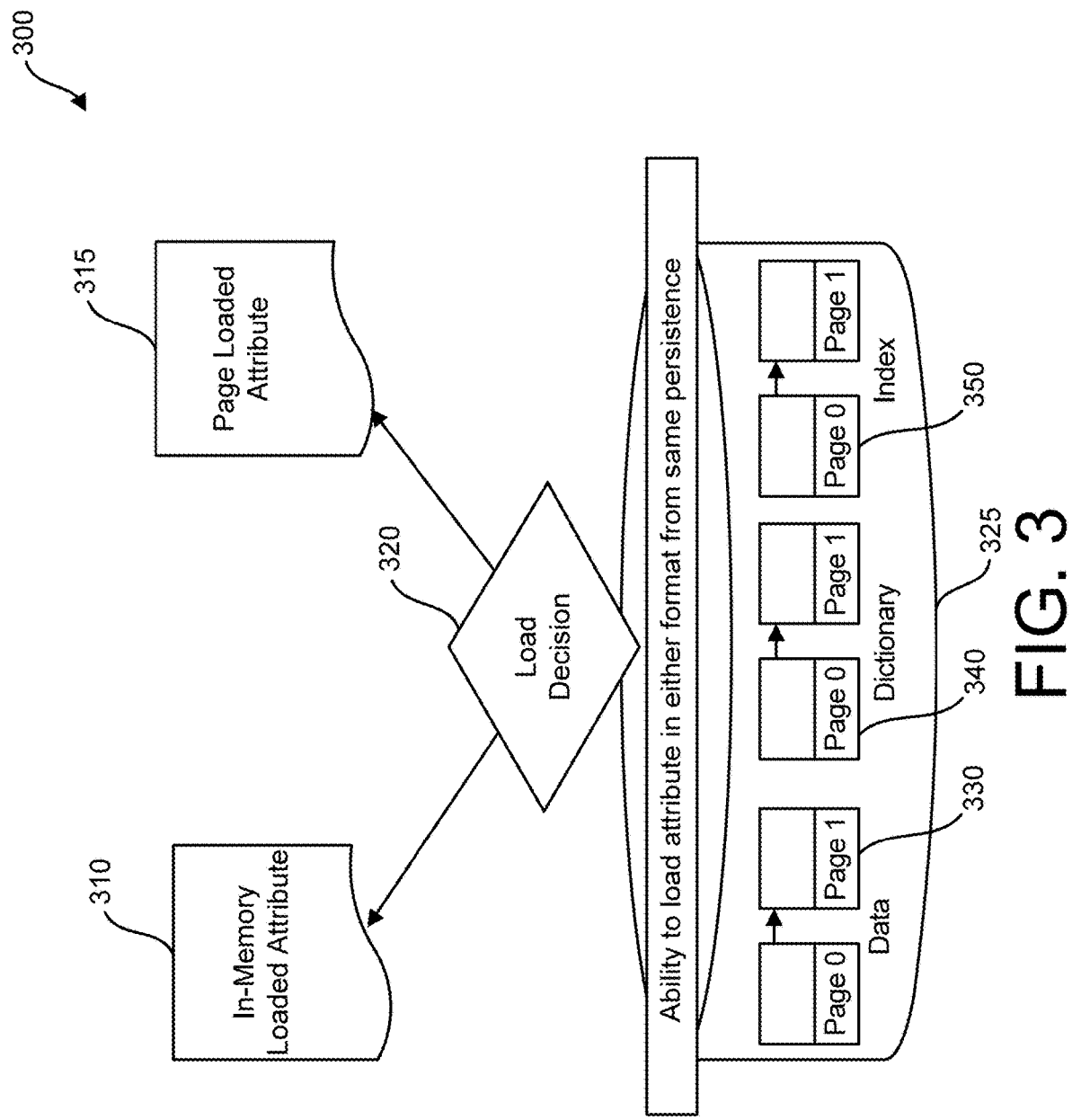
FIG. 3 illustrates an example of a system for implementing a load unit decision, in accordance with some example implementations of the current subject matter.

Referring now to FIG. 3, an example of a system 300 for implementing a load unit decision is shown. When a table is persisted in persistence store 325 according to the unified persistence format, each column of the table has separate page chains for the data, dictionary, and index subcomponents. These are shown as the data page chain 330, dictionary page chain 340, and index page chain 350. When loading a portion of a table into memory, a load unit decision 320 is made dynamically regarding the intended structure of the table in the in-memory store. If the load unit decision 320 is to use page loaded attribute 315 (i.e., a page-loadable load unit), then the table will be loaded into memory using the page-loadable format. The page-loadable format has a separate page chain for the data, dictionary, and index parts of the table. By having separate page chains for the data, dictionary, and index parts of the table, just the relevant pages can be loaded into memory rather than the entire column. If the load unit decision is to use in-memory loaded attribute 310, then the table will be loaded into memory using the column-loadable load unit, also referred to as an in-memory loaded format or a column-loadable format.

If the table or column is defined as in-memory loaded (i.e., column-loadable), then the entirety of the data is read from persistence store 325, and the index vector, dictionary, and inverted index are created as in-memory structures. Once the data has been read from the persistence store 325 and the in-memory structures have been created, then the corresponding pages from the persistence store 325 are not accessed anymore. Accessing data from in-memory structures is faster than accessing the data via specific pages which is what is done for page-loadable format. Using the in-memory index vector, a particular offset can be directly accessed in the in-memory store.

When the column of the table is loaded into memory using the page-loadable format, then only the relevant data is read from persistence store 325 and loaded into memory. In an example, in the page-loadable format, the processor first calculates in which page the offset lies, then that page is loaded, and then data is read from that page. Within that page, additional calculations may be needed from the header to get to the specific offset of a particular row.

Figure 4:
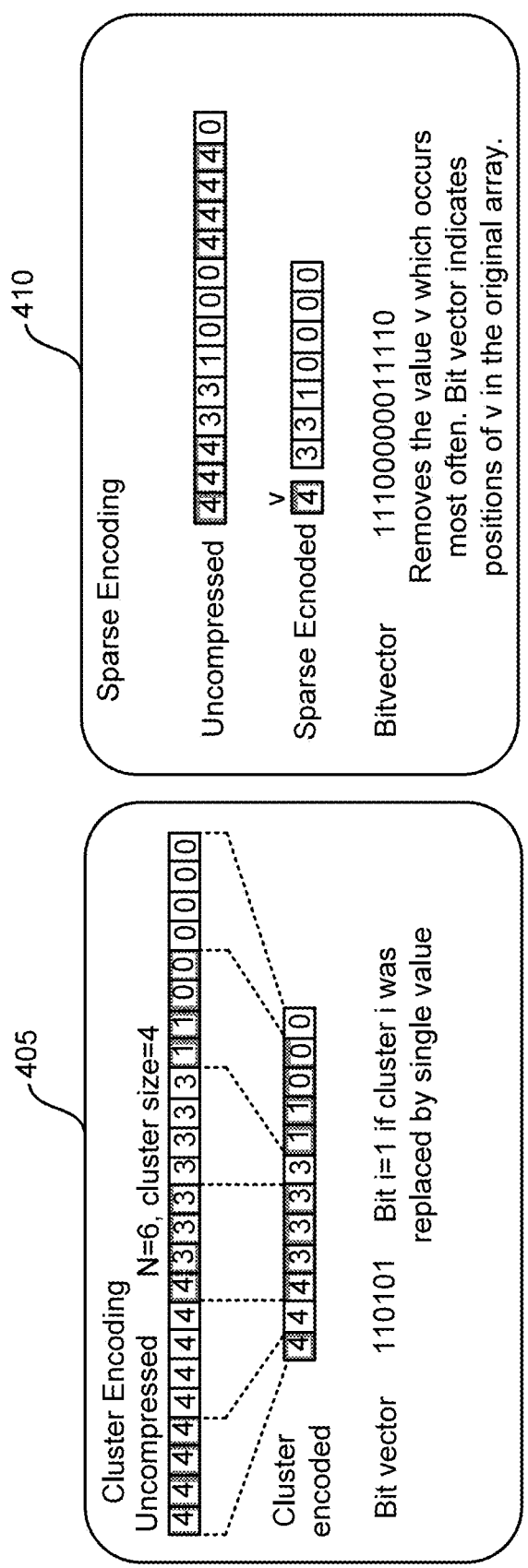
FIG. 4 illustrates examples of various data structure compression techniques that may be performed, in accordance with some example implementations of the current subject matter.

Turning now to FIG. 4, examples of various data structure compression techniques that may be performed are shown. Various types of compression techniques may be employed for compressing data structure primitives. Two examples of compression schemes are shown in FIG. 4. On the left side, a cluster encoding scheme 405 is shown for compressing a series of integer values. In cluster encoding, if all of the values in a cluster size grouping are the same, then only a single value is retained for the cluster. When all of the values in the cluster size grouping are the same, this is indicated by storing a 1 in the corresponding location of a bit vector. A 0 bit is stored in the bit vector to indicate the original cluster values are retained during the encoding process. In the example on the left side of FIG. 4, the cluster size is 4, and N is 6 indicating that there are 6 clusters of data being encoded.

On the right side of FIG. 4, an example of a sparse encoding scheme 410 is shown. In sparse encoding, the value v which occurs most often is removed, with the bit vector indicating positions of v in the original array. In this example, 4 is the value which occurs most often in the original array, and so the bit vector includes a 1 for each occurrence of 4 and a 0 for every other value. The sparse encoded array includes a 4 at the start of the array followed by the occurrences of the other values according to their order in the original array. It should be understood that the examples of FIG. 4 are merely representative of two types of encodings that can be used for database objects and their substructures (i.e., subcomponents). In other embodiments, other types of encodings may be implemented.

Figure 5:
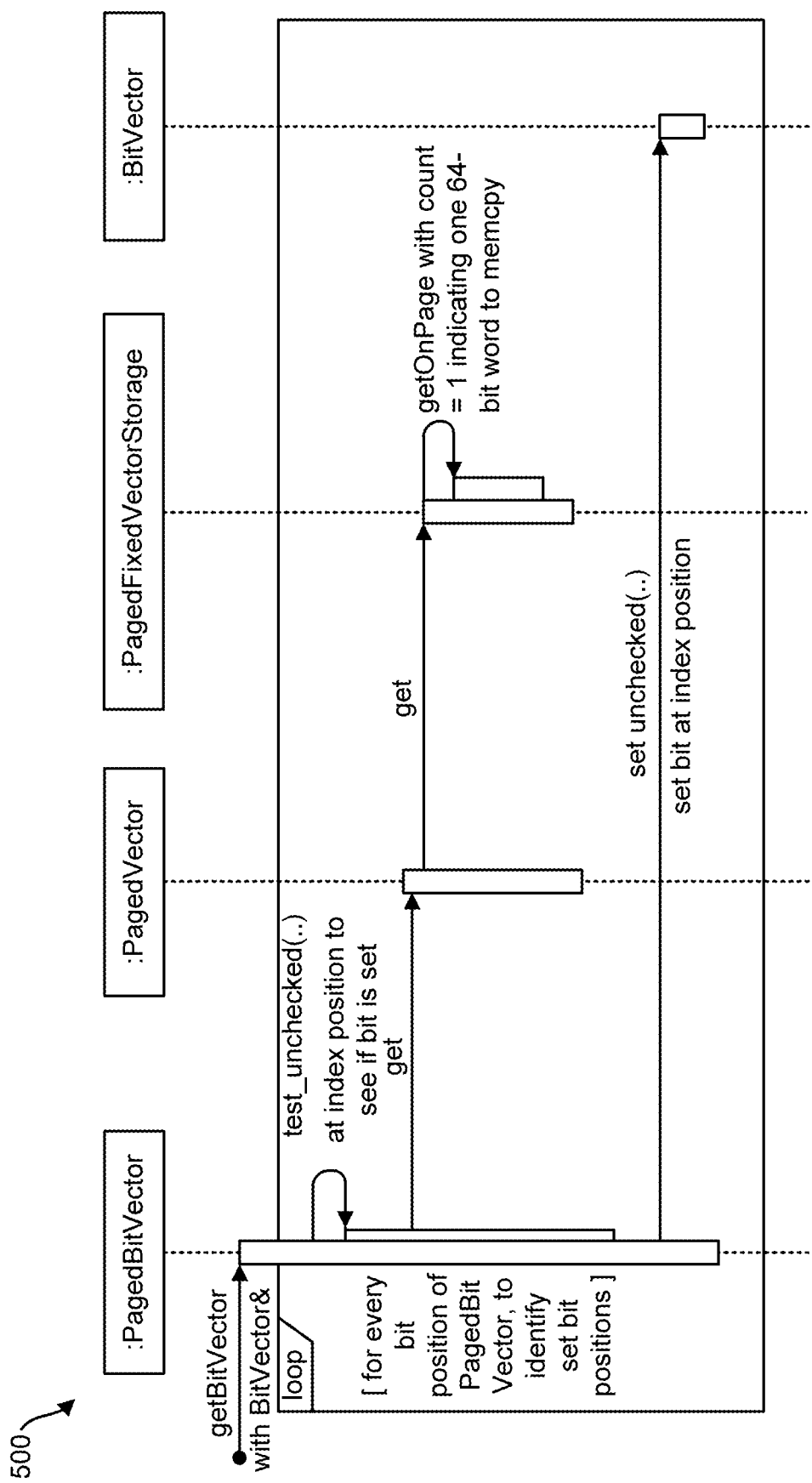
FIG. 5 illustrates an example of a process for implementing a non-native copy mechanism from a paged bit vector to an in-memory bit vector, in accordance with some example implementations of the current subject matter.

Referring now to FIG. 5, an example of a process 500 for implementing a non-native copy mechanism from a paged bit vector to an in-memory bit vector is shown. As shown in FIG. 5, the call hierarchy for the non-native copy mechanism iterates through all of the bits of the paged bit vector, one bit at a time. At each bit, the mechanism checks to see if the bit is set and sets the in-memory bit vector accordingly. This results in an inefficient copy mechanism by iterating bit-by-bit through the paged bit vector. Also, the non-native copy mechanism involves decoding and then reencoding the paged bit vector while using intermediate buffers to store the intermediate decoded results.

Figure 6:
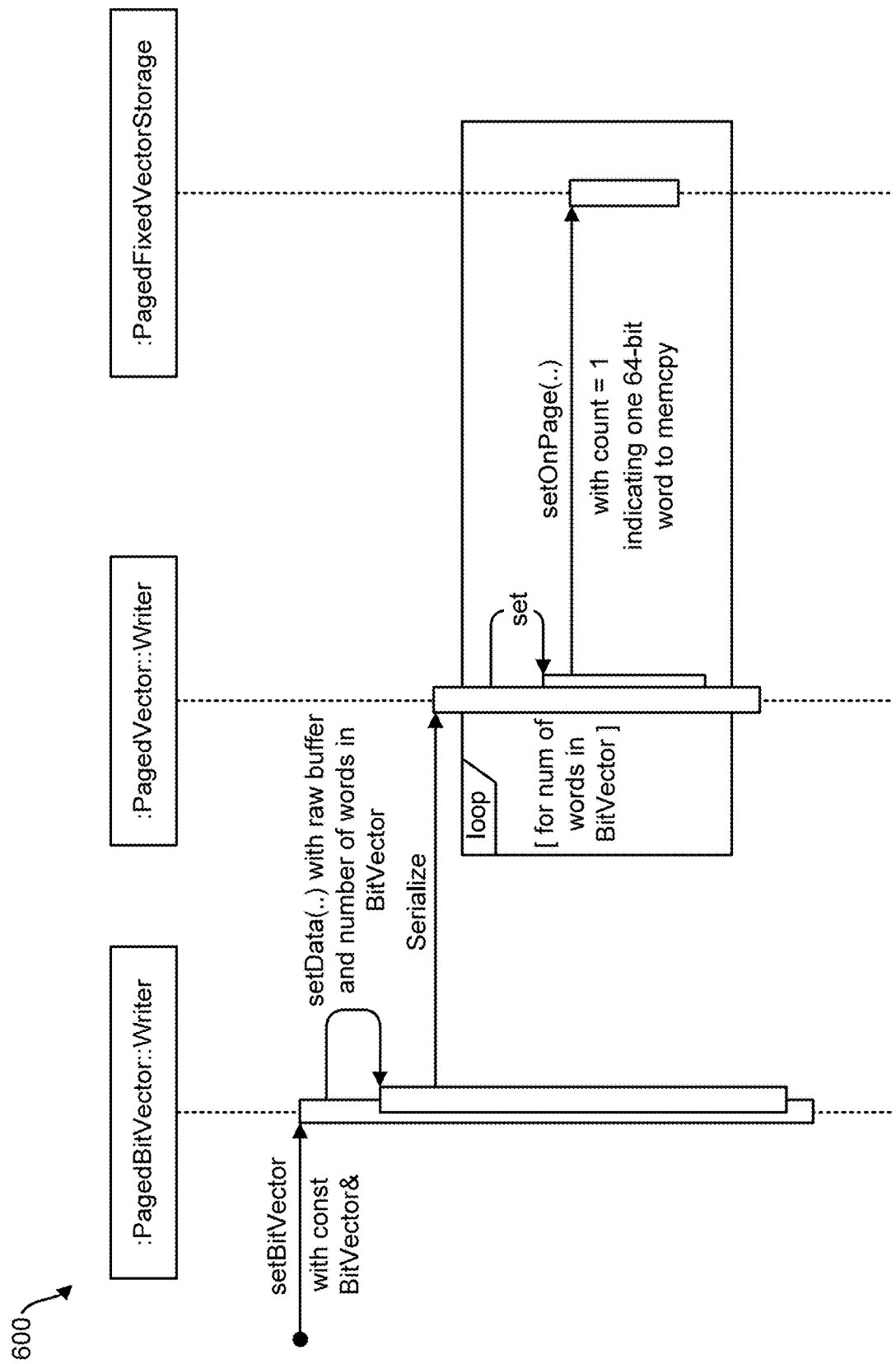
FIG. 6 illustrates an example of a process for implementing a non-native copy mechanism from an in-memory bit vector to a paged bit vector, in accordance with some example implementations of the current subject matter.

Turning now to FIG. 6, an example of a process 600 for implementing a non-native copy mechanism from an in-memory bit vector to a paged bit vector is shown. As shown in FIG. 6, the call hierarchy iterates through all 64-bit words, one word a time, by choosing the length of data as one word length when copying from the in-memory bit vector. Again, this results in an inefficient copy mechanism by iterating word-by-word through the in-memory bit vector.

Figure 7:
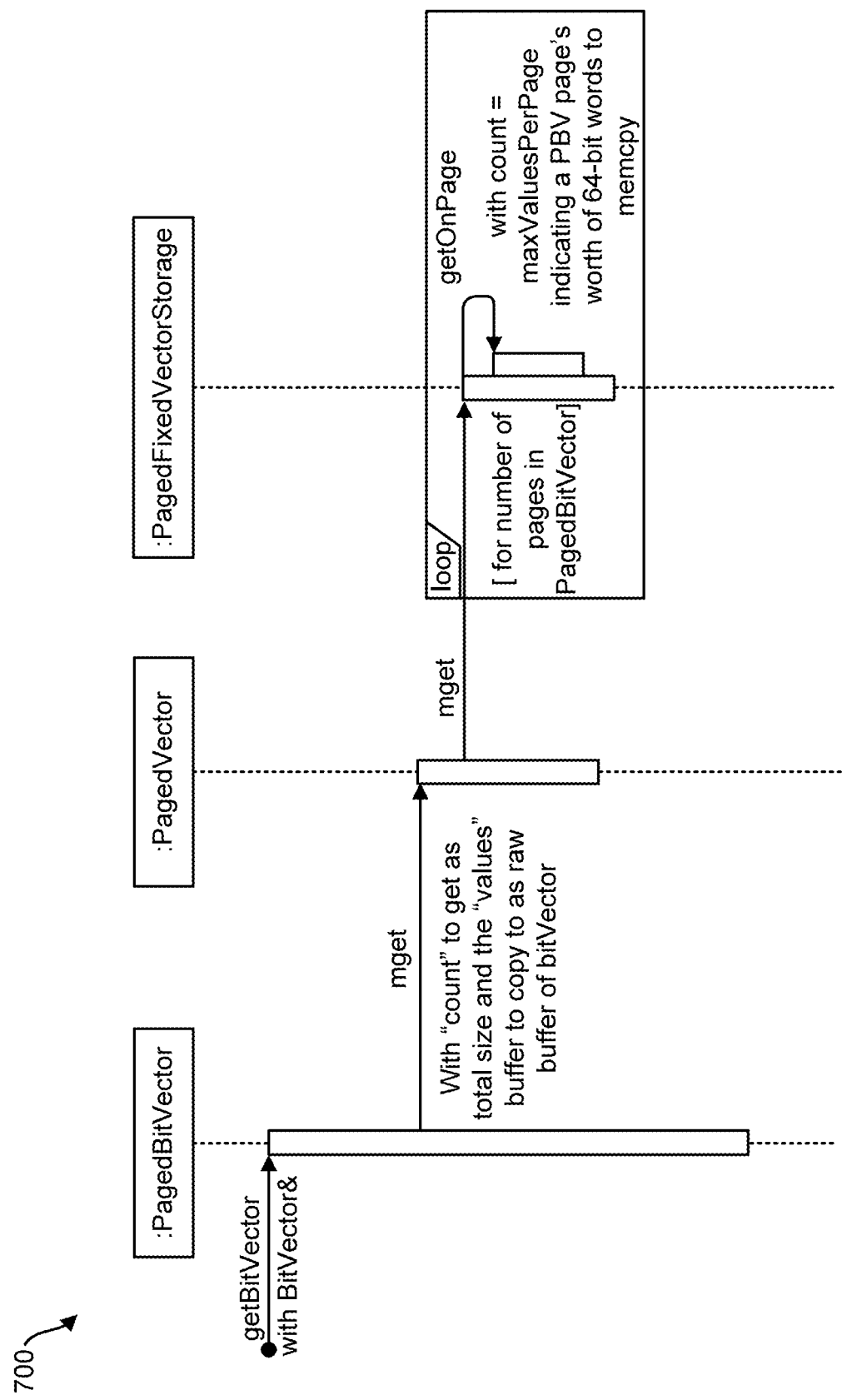
FIG. 7 illustrates an example of a process for implementing a native copy mechanism from a paged bit vector to an in-memory bit vector, in accordance with some example implementations of the current subject matter.

Referring now to FIG. 7, an example of a process 700 for implementing a native copy mechanism from a paged bit vector to an in-memory bit vector is shown. For process 700, the buffer of the paged bit vector is accessed to copy the raw data directly one page at a time. To further optimize the native copy mechanism, prefetching of pages can also be implemented from the paged bit vector to write to the in-memory bit vector. This is in contrast to the process 500 for implementing the non-native copy mechanism where one bit was transferred at a time. In an example, for an implementation of getBitVector( ) with native copy support, the PagedFixedVectorStorage::mget( . . . ) application programming interface (API) is used to retrieve the entire data by iterating through all of the pages. This results in one page being retrieved at a time by calling PagedFixedVectorStorage::getOnPage( . . . ) with a count of "max ValuesPerPage" number of words to fill up an entire page in one call.

Figure 8:
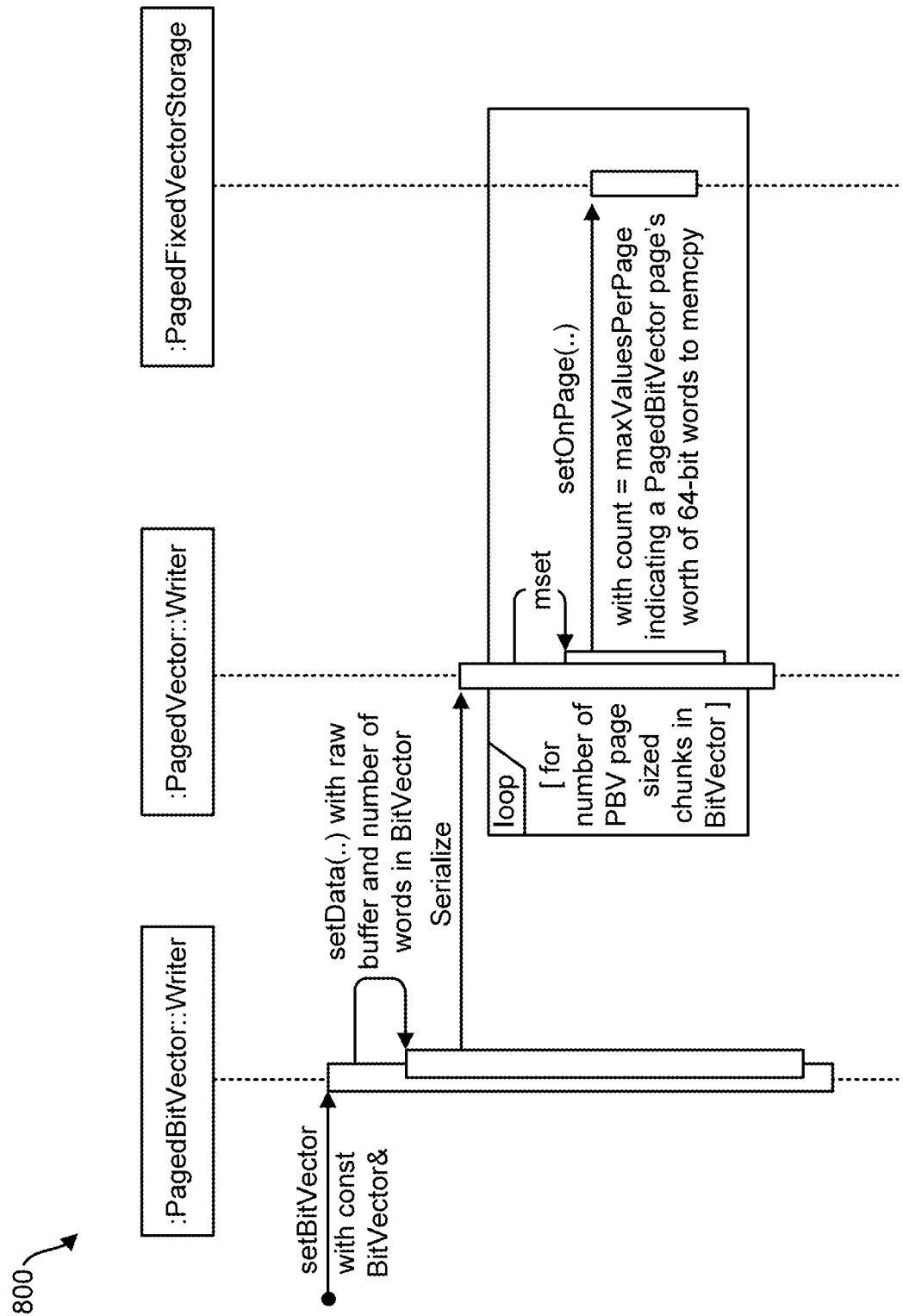
FIG. 8 illustrates an example of a process for implementing a native copy mechanism from an in-memory bit vector to a paged bit vector, in accordance with some example implementations of the current subject matter.

Turning now to FIG. 8, an example of a process 800 for implementing a native copy mechanism from an in-memory bit vector to a paged bit vector is shown. As shown in FIG. 8, the call hierarchy iterates through a given number of words at a time to fill up an entire page in one call, where the given number of words is equal to the maximum values per page. This is in contrast to process 600 (of FIG. 6) which iterated through the in-memory bit vector one word a time. In an example, for an implementation of setBitVector( ) with native copy support, the PagedVector<ValueClass>::Writer::serialize( . . . ) iterates through "max ValuesPerPage" number of words at a time instead of one word value at a time to fill up an entire page in one PagedFixedVectorStorage<BlockHandlerWrapper>::setOnPage( . . . ) call.

Figure 9:
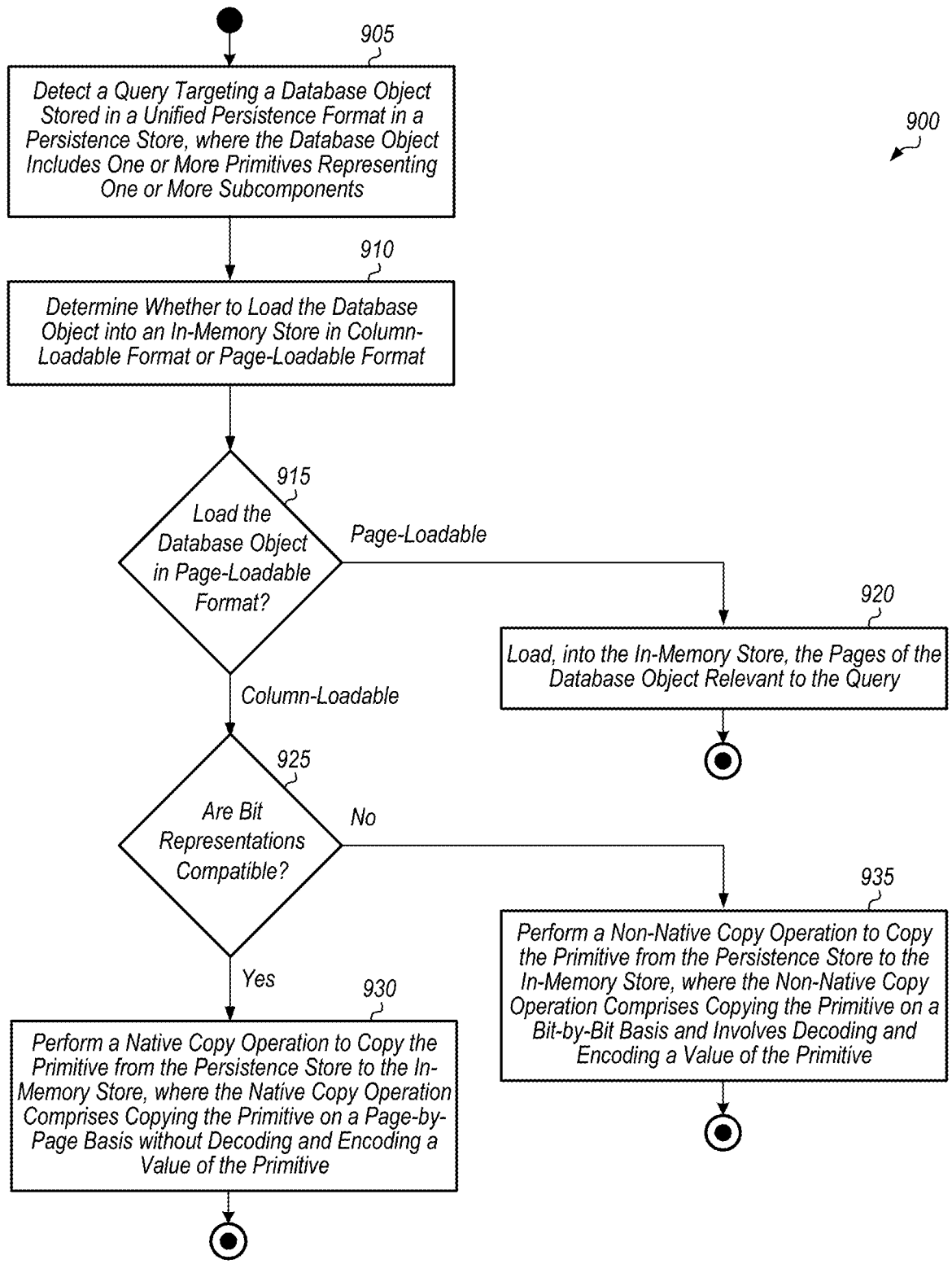
FIG. 9 illustrates an example of a process for determining whether to perform a native copy operation, in accordance with some example implementations of the current subject matter.

Referring now to FIG. 9, a process is depicted for determining whether to perform a native copy operation into memory. A processor (e.g., processor 1310 of FIG. 13) detects a query targeting a first database object stored in a unified persistence format in a persistence store, where the first database object includes one or more primitives representing one or more subcomponents (e.g., data vector, dictionary, index vector) (block 905). In response to detecting the first query, the processor determines whether to load the first database object into an in-memory store in column-loadable format or page-loadable format (block 910).

If the processor determines to load the first database object in page-loadable format into the in-memory store (conditional block 915, "page-loadable" leg), then the processor loads, into the in-memory store, the pages of the first database object relevant to the query (block 920). After block 920, method 900 ends. Otherwise, if the processor determines to load the first database object in column-loadable format into the in-memory store (conditional block 915, "column-loadable" leg), then the processor determines, for each primitive of the one or more primitives, if a first bit representation of the primitive in the persistence store is compatible with a second bit representation used for storing the primitive in the in-memory store (conditional block 925). The processor may determine whether the bit representations are compatible by comparing paged metadata (e.g., paged metadata 285 of FIG. 2) to column metadata (e.g., column metadata 237), by way of non-limiting example.

If the first bit representation of the primitive in the persistence store is compatible with a second bit representation used for storing the primitive in the in-memory store (conditional block 925, "yes" leg), then the processor performs a native copy operation to copy the primitive from the persistence store to the in-memory store, where the native copy operation comprises copying the primitive on a page-by-page basis without decoding and encoding a value of the primitive (block 930). Also, the native copy operation does not involve the use of intermediate buffers. After block 930, method 900 ends.

If the first bit representation of the primitive in the persistence store is not compatible with the second bit representation of the primitive in the in-memory store (conditional block 925, "no" leg), then the processor performs a non-native copy operation to copy the primitive from the persistence store to the in-memory store, where the non-native copy operation comprises copying the primitive on a value-by-value basis and involves decoding and encoding a value of the primitive (block 935). After block 935, method 900 ends.

Figure 10:
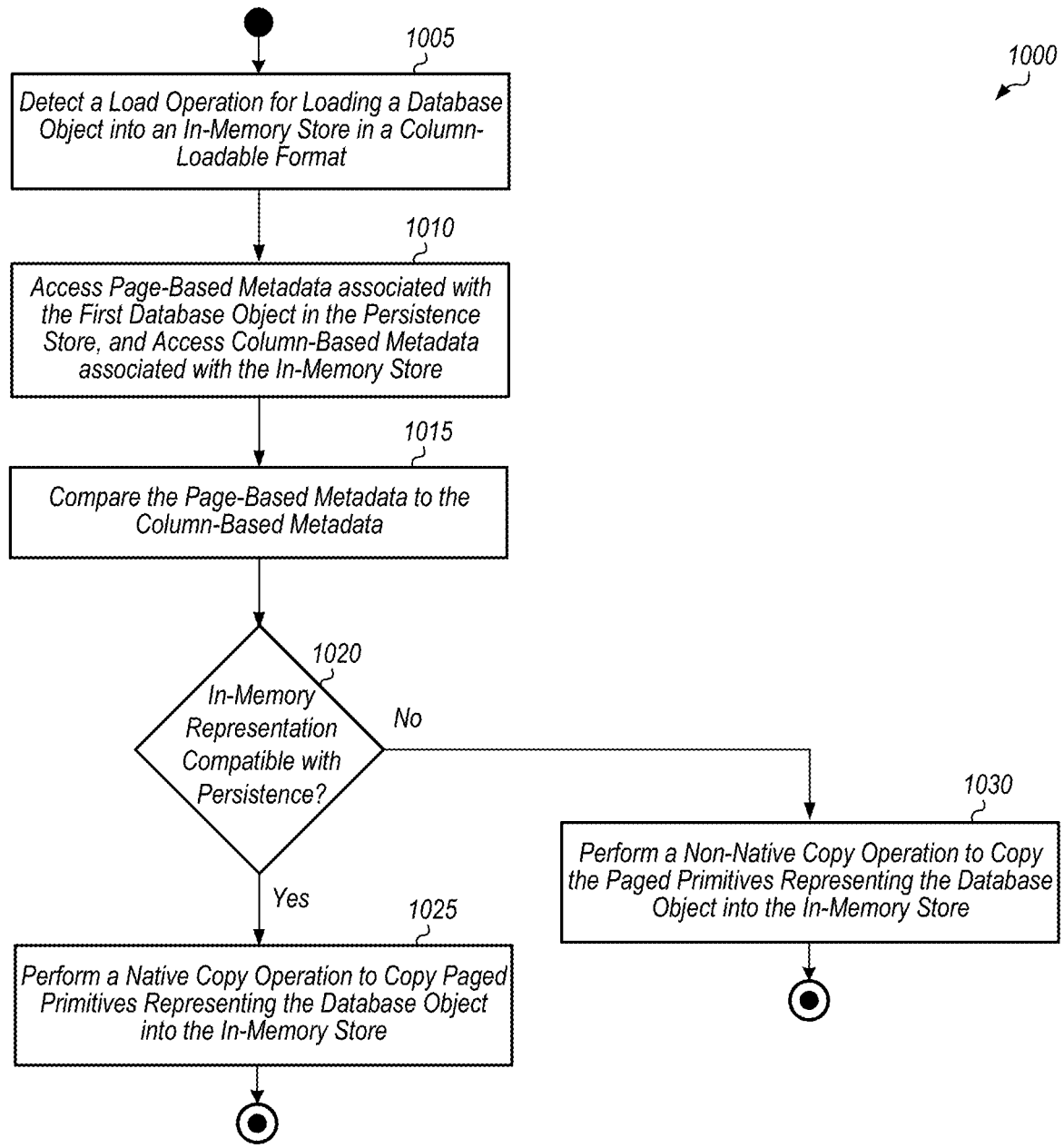
FIG. 10 illustrates an example of a process for comparing page-based metadata to column-based metadata, in accordance with some example implementations of the current subject matter.

Turning now to FIG. 10, a process for comparing page-based metadata to column-based metadata is shown. A processor detects a load operation for loading a database object into an in-memory store in a column-loadable format (block 1005). In response to detecting the load operation, the processor accesses page-based metadata (e.g., paged metadata 285 of FIG. 2) associated with the first database object in the persistence store, and the processor accesses column-based metadata (e.g., column metadata 237) associated with the in-memory store (block 1010). Next, the processor compares the page-based metadata to the column-based metadata (block 1015). The processor determines, based on the page-based metadata to column-based metadata comparison, if an in-memory representation of the database object will be compatible with a persistence store representation of the database object (conditional block 1020). For example, based on the comparison, the processor may determine if the encoding scheme is the same for in-memory and persistence representations, if the number of rows per column are the same, if the number of bits per row element are the same, and so on.

If the in-memory representation of the database object will be compatible with a persistence store representation of the database object (conditional block 1020, "yes" leg), then the processor performs a native copy operation to copy paged primitives representing the database object into the in-memory store (block 1025). After block 1025, method 1000 ends. Otherwise, if the in-memory representation of the database object will be incompatible with the persistence store representation of the database object (conditional block 1020, "no" leg), then the processor performs a non-native copy operation to copy the paged primitives representing the database object into the in-memory store (block 1030). In an example, the non-native copy operation involves, on a value-by-value basis, reading one value from a first primitive while decoding the first primitive representation to a type of value (e.g., int, bit, string). Then, the value is written to a second primitive while encoding the given value (e.g., int, bit, string) to a second primitive representation. After block 1030, method 1000 ends. It is noted that conditional block 1020 may be performed on a per-primitive (or per-subcomponent) basis, such that the compatibility is determined on each primitive independently of the other primitives which represent the subcomponents of the database object.

Figure 11:
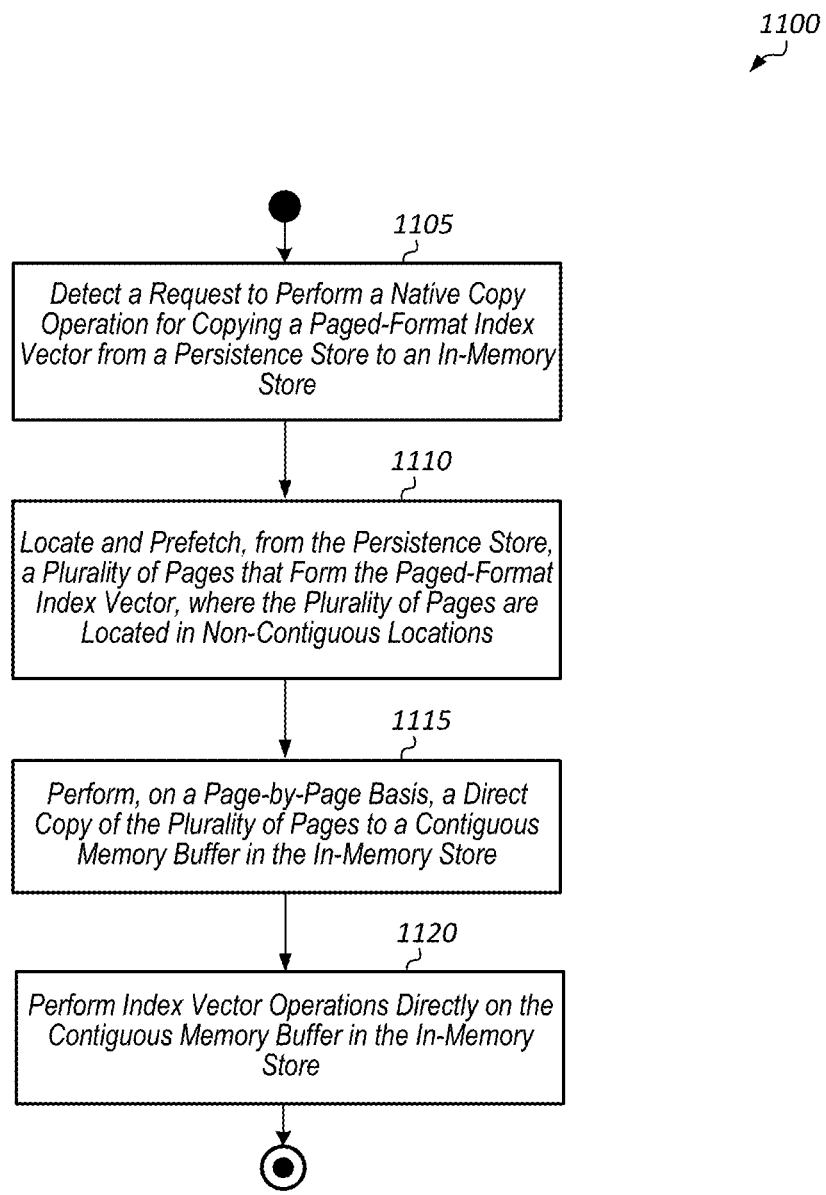
FIG. 11 illustrates an example of a process for loading a paged-format index vector to an in-memory store from a persistence store, in accordance with some example implementations of the current subject matter.

Turning now to FIG. 11, a process for loading a paged-format index vector to an in-memory store from a persistence store is shown. A request to perform a native copy operation for copying a paged-format index vector from a persistence store to an in-memory store is detected (block 1105). In response to detecting the request to perform the native copy operation, the database system locates and prefetches, from the persistence store, a plurality of pages that form the paged-format index vector, where the plurality of pages are located in non-contiguous locations (block 1110). Next, the database system performs, on a page-by-page basis, a direct copy of the plurality of pages to a contiguous memory buffer in the in-memory store (block 1115). Then, index vector operations are performed directly on the contiguous memory buffer in the in-memory store (block 1120). After block 1120, method 1100 ends.

Figure 12:
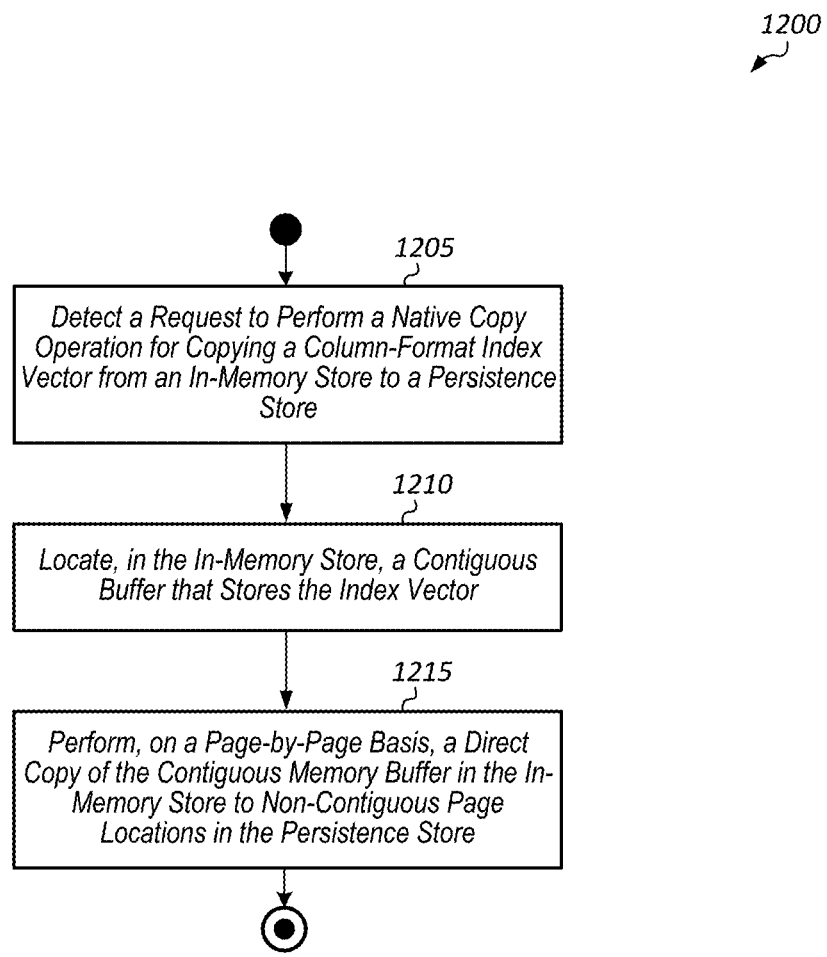
FIG. 12 illustrates an example of a process for storing a column-format index vector to a persistence store from an in-memory store, in accordance with some example implementations of the current subject matter.

Turning now to FIG. 12, a process for storing a column-format index vector to a persistence store from an in-memory store is shown. A request to perform a native copy operation for copying a column-format index vector from an in-memory store to a persistence store is detected (block 1205). In response to detecting the request to perform the native copy operation, the database system locates, in the in-memory store, contiguous memory buffer that stores the index vector (block 1210). Next, the database system performs, on a page-by-page basis, a direct copy of the contiguous memory buffer in the in-memory store to non-contiguous page locations in the persistence store (block 1215). When performing the direct copy, the number of values that are selected to be copied in a particular page are selected in such a way to ensure that the last value copied ends at a word boundary and not in the middle of a word. The remaining space in the page in the persistence store remains un-used. The native copy operation is performed to pack a maximum number of values in the page while ensuring that the last value copied ends at a word boundary. The maximum number of values copied depends on the page size and the number of bits used to encode each value. This packing strategy ensures that the memmove function can be performed from the in-memory contiguous vector to a set of pages and from the set of pages to the in-memory contiguous vector. Word alignment allows the use of streaming single instruction, multiple data (SIMD) extensions. After block 1215, method 1200 ends.

Figure 13A:
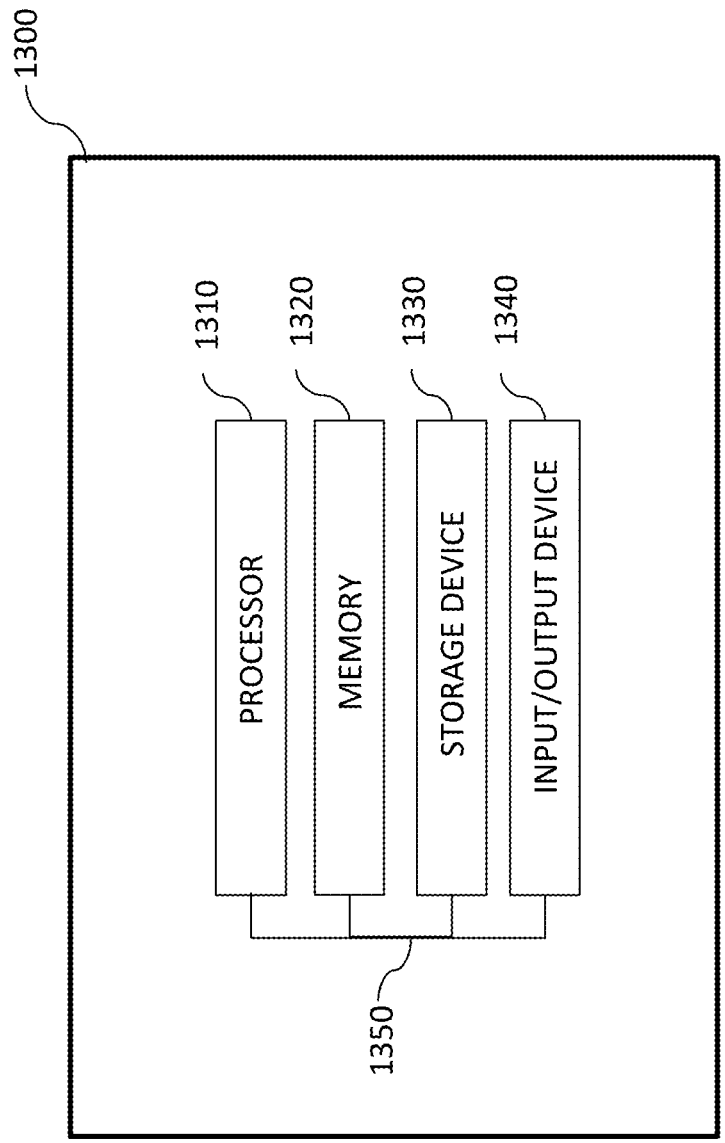
FIG. 13A depicts an example of a system, in accordance with some example implementations of the current subject matter.

In some implementations, the current subject matter may be configured to be implemented in a system 1300, as shown in FIG. 13A. The system 1300 may include a processor 1310, a memory 1320, a storage device 1330, and an input/output device 1340. Each of the components 1310, 1320, 1330 and 1340 may be interconnected using a system bus 1350. The processor 1310 may be configured to process instructions for execution within the system 1300. In some implementations, the processor 1310 may be a single-threaded processor. In alternate implementations, the processor 1310 may be a multi-threaded processor. The processor 1310 may be further configured to process instructions stored in the memory 1320 or on the storage device 1330, including receiving or sending information through the input/output device 1340. The memory 1320 may store information within the system 1300. In some implementations, the memory 1320 may be a computer-readable medium. In alternate implementations, the memory 1320 may be a volatile memory unit. In yet some implementations, the memory 1320 may be a non-volatile memory unit. The storage device 1330 may be capable of providing mass storage for the system 1300. In some implementations, the storage device 1330 may be a computer-readable medium. In alternate implementations, the storage device 1330 may be a floppy disk device, a hard disk device, an optical disk device, a tape device, non-volatile solid state memory, or any other type of storage device. The input/output device 1340 may be configured to provide input/output operations for the system 1300. In some implementations, the input/output device 1340 may include a keyboard and/or pointing device. In alternate implementations, the input/output device 1340 may include a display unit for displaying graphical user interfaces.

Figure 13B:
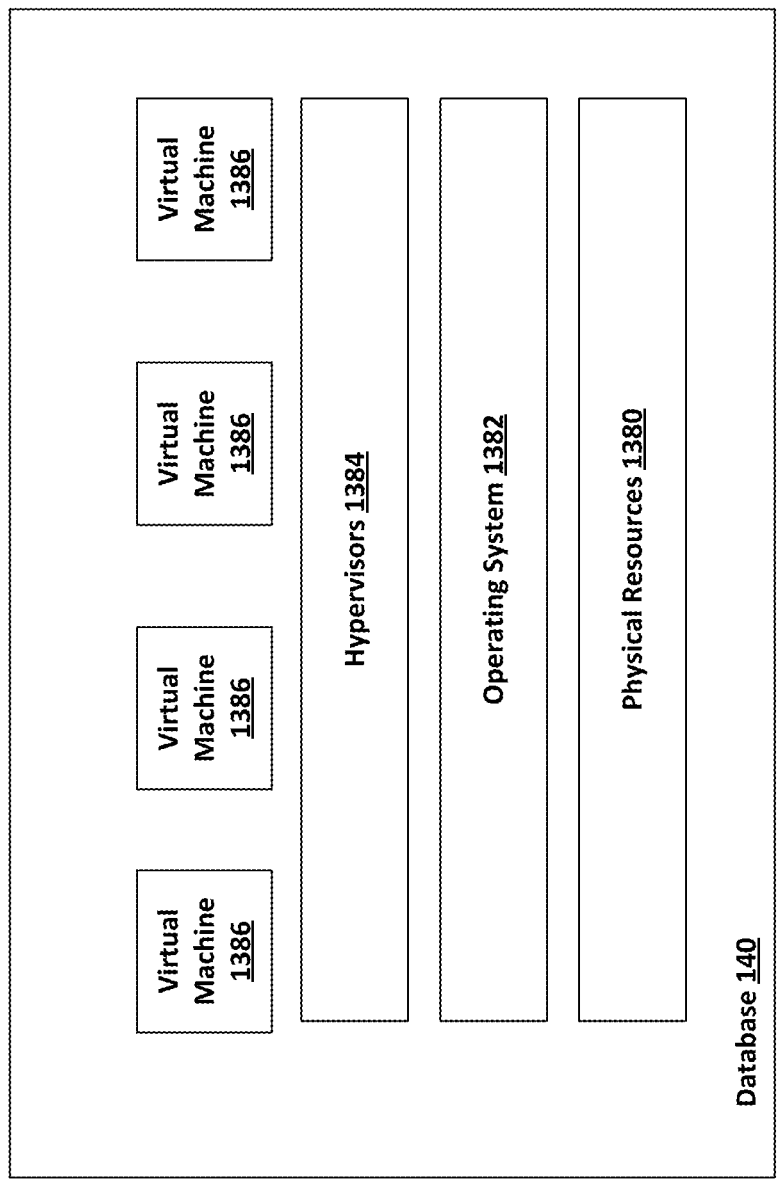
FIG. 13B depicts another example of a system, in accordance with some example implementations of the current subject matter.

FIG. 13B depicts an example implementation of the database 140, which provides database services. The database 140 may include physical resources 1380, such as at least one hardware servers, at least one storage, at least one memory, at least one network interface, and the like. The database 140 may also include infrastructure, as noted above, which may include at least one operating systems 1382 for the physical resources and at least one hypervisor 1384 (which may create and run at least one virtual machine 1386). For example, each multitenant application may be run on a corresponding virtual machine.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method performed by a database system, comprising: detecting a first query targeting a first database object stored in a unified persistence format in a persistence store, wherein a persistence representation of the first database object comprises one or more primitives; determining whether to load the first database object in column-loadable format or page-loadable format into an in-memory store, responsive to detecting the first query; responsive to determining to load the first database object in the column-loadable format into the in-memory store, determining if a first bit representation of the one or more primitives in the persistence store is compatible with a second bit representation used for storing the one or more primitives in the in-memory store; and performing a native copy operation to copy the one or more primitives from the persistence store to the in-memory store responsive to determining that the first bit representation is compatible with the second bit representation, wherein the native copy operation comprises copying the one or more primitives on a page-by-page basis without decoding and encoding values of the one or more primitives.

Example 2: The method of Example 1, wherein an in-memory representation of the first database object comprises at least a first primitive and a second primitive, the method further comprising: performing the native copy operation to copy the first primitive from the persistence store to the in-memory store responsive to determining that the persistence store and the in-memory store have compatible bit representations for representing the first primitive; and performing a non-native copy operation to copy the second primitive from the persistence store to the in-memory store responsive to determining that the persistence store and the in-memory store have incompatible bit representations for representing the second primitive, wherein the non-native copy operation comprises copying the second primitive on a value-by-value basis while also decoding and encoding the second primitive.

Example 3: The method of any of Examples 1-2, wherein determining if the first bit representation is compatible with the second bit representation comprises determining whether a first number of rows of the first bit representation is equal to a second number of rows in the second bit representation.

Example 4: The method of any of Examples 1-3, wherein determining if the first bit representation is compatible with the second bit representation further comprises determining whether a first number of bits per row element of the first bit representation is equal to a second number of bits per row element in the second bit representation.

Example 5: The method of any of Examples 1-4, wherein determining if the first bit representation is compatible with the second bit representation comprises determining whether a first encoding for generating the first bit representation is equivalent to a second encoding for generating the second bit representation.

Example 6: The method of any of Examples 1-5, wherein determining if the first bit representation is compatible with the second bit representation comprises: accessing first metadata associated with the first database object in the persistence store; accessing second metadata associated with the in-memory store; and comparing the first metadata to the second metadata.

Example 7: The method of any of Examples 1-6, wherein the first metadata is paged-format metadata and where the second metadata is column-format metadata.

Example 8: The method of any of Examples 1-7, wherein the one or more primitives comprise a paged bit vector.

Example 9: The method of any of Examples 1-8, wherein the one or more primitives comprise a paged index vector.

Example 10: The method of any of Examples 1-9, wherein the paged index vector is a bit-compressed index vector.

Example 11: The method of any of Examples 1-10, further comprising: detecting a save operation corresponding to a second database object stored in the in-memory store; and performing a second native copy operation to copy one or more second primitives of the second database object from the in-memory store to the persistence store responsive to determining that a third bit representation of the second database object in the in-memory store is compatible with a fourth bit representation used for storing the second database object in the persistence store.

Example 12: A system, comprising: at least one processor; and at least one memory including program instructions which when executed by the at least one processor causes operations comprising: detecting a first query targeting a first database object stored in a unified persistence format in a persistence store, wherein a persistence representation of the first database object comprises one or more primitives; determining whether to load the first database object in column-loadable format or page-loadable format into an in-memory store, responsive to detecting the first query; responsive to determining to load the first database object in the column-loadable format into the in-memory store, determining if a first bit representation of the one or more primitives in the persistence store is compatible with a second bit representation used for storing the one or more primitives in the in-memory store; and performing a native copy operation to copy the one or more primitives from the persistence store to the in-memory store responsive to determining that the first bit representation is compatible with the second bit representation, wherein the native copy operation comprises copying the one or more primitives on a page-by-page basis without decoding and encoding values of the one or more primitives.

Example 13: The system of Example 12, wherein the program instructions are further executable by the at least one processor to cause operations comprising: performing the native copy operation to copy the first primitive from the persistence store to the in-memory store responsive to determining that the persistence store and the in-memory store have compatible bit representations for representing the first primitive; and performing a non-native copy operation to copy the second primitive from the persistence store to the in-memory store responsive to determining that the persistence store and the in-memory store have incompatible bit representations for representing the second primitive, wherein the non-native copy operation comprises copying the second primitive on a value-by-value basis while also decoding and encoding the second primitive.

Example 14: The system of any of Examples 12-13, wherein determining if the first bit representation is compatible with the second bit representation comprises determining whether a first number of rows of the first bit representation is equal to a second number of rows in the second bit representation.

Example 15: The system of any of Examples 12-14, wherein determining if the first bit representation is compatible with the second bit representation comprises determining whether a first number of bits per row element of the first bit representation is equal to a second number of bits per row element in the second bit representation.

Example 16: The system of any of Examples 12-13, wherein determining if the first bit representation is compatible with the second bit representation comprises determining whether a first encoding for generating the first bit representation is equivalent to a second encoding for generating the second bit representation.

Example 17: The system of any of Examples 12-13, wherein determining if the first bit representation is compatible with the second bit representation comprises: accessing first metadata associated with the first database object in the persistence store; accessing second metadata associated with the in-memory store; and comparing the first metadata to the second metadata.

Example 18: The system of any of Examples 12-13, wherein the first metadata is paged-format metadata and where the second metadata is column-format metadata.

Example 19: The system of any of Examples 12-13, wherein the one or more primitives comprise a paged bit vector.

Example 20: A non-transitory computer readable medium storing instructions, which when executed by at least one data processor, cause operations comprising: detecting a first query targeting a first database object stored in a unified persistence format in a persistence store, wherein a persistence representation of the first database object comprises one or more primitives; determining whether to load the first database object in column-loadable format or page-loadable format into an in-memory store, responsive to detecting the first query; responsive to determining to load the first database object in the column-loadable format into the in-memory store, determining if a first bit representation of the one or more primitives in the persistence store is compatible with a second bit representation used for storing the one or more primitives in the in-memory store; and performing a native copy operation to copy the one or more primitives from the persistence store to the in-memory store responsive to determining that the first bit representation is compatible with the second bit representation, wherein the native copy operation comprises copying the one or more primitives on a page-by-page basis without decoding and encoding values of the one or more primitives.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method performed by a database system, comprising:
    detecting a load operation for loading a first database object into an in-memory store in a column-loadable format;
    responsive to detecting the load operation:
        accessing page-based metadata associated with the first database object in a persistence store, and accessing column-based metadata associated with the in-memory store;
        comparing the page-based metadata to the column-based metadata;
    determining, based on the comparison of the page-based metadata to the column-based metadata, whether an in-memory representation of the first database object will be compatible with a persistence store representation of the first database object; and
    responsive to determining that the in-memory representation of the first database object will be compatible with the persistence store representation of the first database object, performing a native copy operation to copy one or more paged primitives representing the first database object into the in-memory store.

2. The method of claim 1, wherein the native copy operation comprises copying the one or more paged primitives on a page-by-page basis without decoding and encoding values of the one or more paged primitives.

3. The method of claim 1, wherein determining if the in-memory representation of the first database object will be compatible with the persistence store representation of the first database object is performed on a per-primitive basis.

4. The method of claim 1, further comprising determining if a first number of rows per column used for the in-memory representation are equal to a second number of rows per column used for the persistence store representation.

5. The method of claim 1, further comprising determining if a first number of bits per row element used for the in-memory representation are equal to a second number of bits per row element used for the persistence store representation.

6. The method of claim 1, wherein responsive to determining that the in-memory representation of the first database object will be incompatible with the persistence store representation of the first database object, the method further comprising performing a non-native copy operation to copy the one or more paged primitives representing the first database object into the in-memory store.

7. The method of claim 1, further comprising locating a contiguous memory buffer that stores the one or more paged primitives.

8. The method of claim 1, wherein the one or more paged primitives comprise a paged bit vector.

9. The method of claim 1, wherein the one or more paged primitives comprise a paged index vector.

10. The method of claim 9, wherein the paged index vector is a bit-compressed index vector.

11. A system, comprising:
    at least one processor; and
    at least one memory including program instructions which when executed by the at least one processor causes operations comprising:
        detecting a load operation for loading a first database object into an in-memory store in a column-loadable format;
    responsive to detecting the load operation:
        accessing page-based metadata associated with the first database object in a persistence store, and accessing column-based metadata associated with the in-memory store;
        comparing the page-based metadata to the column-based metadata;
        determining, based on the comparison of the page-based metadata to the column-based metadata, whether an in-memory representation of the first database object will be compatible with a persistence store representation of the first database object; and
        responsive to determining that the in-memory representation of the first database object will be compatible with the persistence store representation of the first database object, performing a native copy operation to copy one or more paged primitives representing the first database object into the in-memory store.

12. The system of claim 11, wherein the native copy operation comprises copying the one or more paged primitives on a page-by-page basis without decoding and encoding values of the one or more paged primitives.

13. The system of claim 11, wherein determining if the in-memory representation of the first database object will be compatible with the persistence store representation of the first database object is performed on a per-primitive basis.

14. The system of claim 11, wherein the operations further comprise determining if a first number of rows per column used for the in-memory representation are equal to a second number of rows per column used for the persistence store representation.

15. The system of claim 11, wherein the operations further comprise determining if a first number of bits per row element used for the in-memory representation are equal to a second number of bits per row element used for the persistence store representation.

16. The system of claim 11, wherein responsive to determining that the in-memory representation of the first database object will be incompatible with the persistence store representation of the first database object, the operations further comprise performing a non-native copy operation to copy the one or more paged primitives representing the first database object into the in-memory store.

17. The system of claim 11, wherein the operations further comprise locating a contiguous memory buffer that stores the one or more paged primitives.

18. The system of claim 11, wherein the one or more paged primitives comprise a paged bit vector.

19. The system of claim 11, wherein the one or more paged primitives comprise a paged index vector.

20. A non-transitory computer readable storage medium storing instructions, which when executed by at least one data processor, cause operations comprising:

detecting a load operation for loading a first database object into an in-memory store in a column-loadable format;

responsive to detecting the load operation:

accessing page-based metadata associated with the first database object in a persistence store, and accessing column-based metadata associated with the in-memory store;

comparing the page-based metadata to the column-based metadata;

determining, based on the comparison of the page-based metadata to the column-based metadata, whether an in-memory representation of the first database object will be compatible with a persistence store representation of the first database object; and responsive to determining that the in-memory representation of the first database object will be compatible with the persistence store representation of the first database object, performing a native copy operation to copy one or more paged primitives representing the first database object into the in-memory store.

\* \* \* \* \*